(No Model.)
G. VON OTTO.
ICE VELOCIPEDE.
No. 554,346. Patented Feb. 11, 1896.
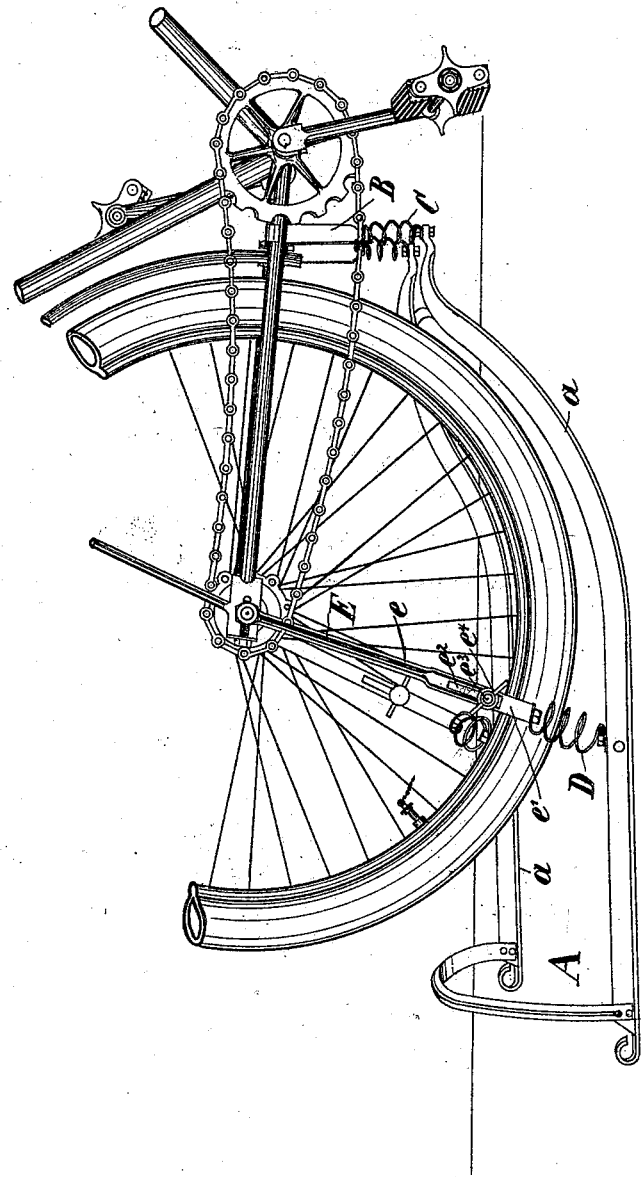
Witnesses:
Th. Hauck
W. Eckert
Inventor
Georg von Otto
by his attorneys

UNITED STATES PATENT OFFICE.

GEORG VON OTTO, OF BLASEWITZ, GERMANY.

ICE-VELOCIPEDE.

SPECIFICATION forming part of Letters Patent No. 554,346, dated February 11, 1896.

Application filed March 13, 1895. Serial No. 541,632. (No model.)

*To all whom it may concern:*

Be it known that I, GEORG VON OTTO, sculptor, of Deutsche Kaiser-Allee, in Blasewitz, in the Kingdom of Saxony, Empire of Germany, have invented new and useful Improvements in Bicycle-Sledges, of which the following is a specification.

Hitherto it has not been known how to render bicycles suitable and safe for use on snow-covered roads, the india-rubber tires of these wheels constantly becoming loose and sliding out of place. By the application of a sledge furnished with springs I overcome these objections.

To that end, as shown by the figure of the accompanying drawing, I attach the sledge A, which is composed of two iron bands $a$ secured together, where it can be easily reached, in front of the fork wherein the rear wheel turns, and also connected to the axle of this wheel. Clips B, attached to the bands at their forward ends by springs C, are there secured to the frame of the machine, while the rear portion of the sledge is secured by springs D to arms E, secured on the axle of the wheel. These springs are similar on both sides of the sledge-frame, at front and rear, but the rear springs are preferably made stronger than the front ones. The springs C D act independently of each other and thereby equalize the pressure on the india-rubber tire, irrespective of the inclination of the wheel to either side. The wheel revolves between the two portions of the sledge unhindered.

When the bicycle is unencumbered the rear wheel is slightly raised and the sledge A rests upon the ground.

In order that the bicycle may move easily over the street, means are provided for the raising of the iron bands constituting the sledge. The arms E are each made of two pieces $e\ e'$, telescopic upon each other and provided with slots $e^2$, through which a bolt $e^3$, having a thumb-nut $e^4$, enters for securing the sledge at any desired height. The sledge performs the double function of preventing the loosening of the tire and of securing the equipoise.

Having now described my invention, what I claim, and desire to secure by Letters Patent, is—

In a bicycle the attachment of a sledge composed of two adjustable iron bands $a\ a$ secured to the back wheel by means of springs C C and clips B B in combination with springs D D and arms E E the latter being secured on the axle of the wheel substantially as set forth.

In witness whereof I have hereunto signed my name in the presence of two subscribing witnesses.

GEORG VON OTTO.

Witnesses:
   RUD ZIPSERF,
   FELIX LOEPER.